United States Patent
Akahori

(10) Patent No.: US 9,353,248 B2
(45) Date of Patent: May 31, 2016

(54) RUBBER COMPOSITION FOR USE IN TIRE TREADS AND PNEUMATIC TIRE USING THE SAME

(75) Inventor: Yayoi Akahori, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 173 days.

(21) Appl. No.: 13/083,255

(22) Filed: Apr. 8, 2011

(65) Prior Publication Data

US 2012/0259037 A1    Oct. 11, 2012

(51) Int. Cl.
*C08L 7/00* (2006.01)
*C08L 9/00* (2006.01)

(52) U.S. Cl.
CPC .... *C08L 7/00* (2013.01); *C08L 9/00* (2013.01)

(58) Field of Classification Search
USPC .................................. 523/152, 153, 155, 156
See application file for complete search history.

(56) References Cited

U.S. PATENT DOCUMENTS

| | | | | |
|---|---|---|---|---|
| 2,720,468 A | * | 10/1955 | Shacklett | 430/523 |
| 5,717,026 A | * | 2/1998 | Ikimine et al. | 525/56 |
| 6,046,272 A | * | 4/2000 | Phung | 525/56 |
| 2006/0122315 A1 | * | 6/2006 | Lin et al. | 524/492 |
| 2011/0237707 A1 | * | 9/2011 | Hidrot | 523/156 |
| 2012/0045743 A1 | * | 2/2012 | Okano et al. | 434/272 |

FOREIGN PATENT DOCUMENTS

| | | | | |
|---|---|---|---|---|
| EP | 940435 A1 | * | 9/1999 | C08L 21/00 |
| JP | 2001-279020 | | 10/2001 | |
| JP | 3553890 | | 8/2004 | |

OTHER PUBLICATIONS

Mowiol by Clariant Product Information Sheet, http://www2.cbm.uam.es/confocal/Manuales/mowiol.pdf, 105 pages, published Dec. 1999.*

* cited by examiner

*Primary Examiner* — Nicole M Buie-Hatcher
*Assistant Examiner* — Chelsea M Christensen
(74) *Attorney, Agent, or Firm* — Thorpe North & Western

(57) ABSTRACT

Disclosed herein is a rubber composition for use in tire treads including a rubber component and, per 100 parts by mass thereof, from 1 to 20 parts by mass of a gel; and a pneumatic tire using the rubber composition in a tread. The gel can be produced by dissolving a polyvinyl alcohol powder in an aqueous solution containing water or water and an organic solvent including a group selected from a hydroxy group, an amino group, and an amide group; and crosslinking by adding a crosslinking agent thereto.

12 Claims, 1 Drawing Sheet

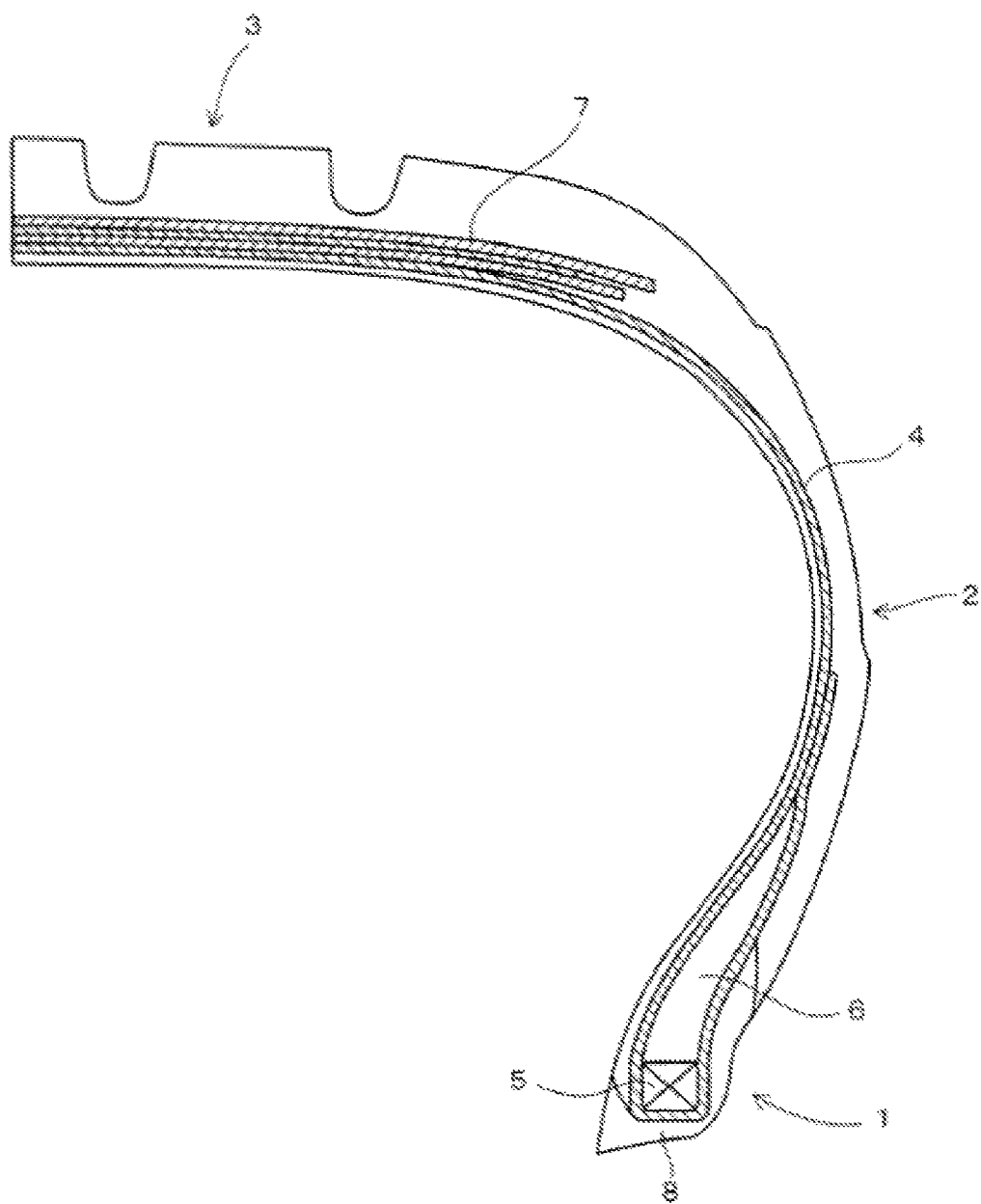

RUBBER COMPOSITION FOR USE IN TIRE TREADS AND PNEUMATIC TIRE USING THE SAME

PRIORITY CLAIM

Priority is claimed to Japan Patent Application Serial No. 2010-048543 filed on 5 Mar. 2010, the contents of which is incorporated herein by reference in its entirety.

BACKGROUND

1. Technical Field

The present technology relates to a rubber composition for use in tire treads and a pneumatic tire using the same, and particularly relates to a rubber composition for use in tire treads and a pneumatic tire using the same having superior frictional force on ice and abrasion resistance.

2. Related Art

In recent years, enhancing frictional performance on ice has been an issue in the field of passenger car-use studless tires. As such, many techniques for enhancing frictional force on ice have been researched in which rubber is compounded with hard foreign material, a blowing agent, and hollow particles, and in which micro irregularities are formed on a surface of a tire in order to remove the water film that occurs on the surface of ice. However, in these methods, due to the brittle properties of the additives, a portion of the additives is micronized or destroyed after mixing and this leads to a problem of cases in which the desired effects cannot be displayed. Additionally, when mixing these foreign powders with a rubber composition, it is common for the abrasion resistance of the rubber vulcanized product to decline markedly. Japanese Patent No. 3553890 proposes a rubber composition for use in tires wherein an expandable graphite having a specific size is added to a diene rubber.

SUMMARY

The present technology can provide a rubber composition for use in tire treads and a pneumatic tire using the same having frictional force on ice and abrasion resistance superior to conventional technologies. The inventors, as a result of diligent research, discovered that the technology can be achieved by compounding a specific amount of a gel of a polyvinyl alcohol in a rubber component.

The present technology is described hereinafter.

A rubber composition for use in tire treads according to an example includes a rubber component and, per 100 parts by mass thereof, from 1 to 20 parts by mass of a gel of a polyvinyl alcohol.

The gel can be obtained by dissolving a polyvinyl alcohol powder in an aqueous solution containing water or water and an organic solvent including a group selected from a hydroxy group, an amino group, and an amide group; and crosslinking by adding a crosslinking agent thereto.

The crosslinking agent can be added at a ratio of from 0.1 to 60 mass % with respect to the polyvinyl alcohol powder. In one example, the crosslinking agent can be an organic titanium compound.

The rubber composition can have a mixture ratio of the polyvinyl alcohol powder to the water or the aqueous solution containing the water and the organic solvent of 1:5 through 1:55.

The rubber component can include at least one diene rubber selected from natural rubber and butadiene rubber.

The rubber composition can be used to form a tread for a pneumatic tire.

By compounding a specific amount of a gel of a polyvinyl alcohol in a rubber component according to the present technology, a rubber composition for use in tire treads and a pneumatic tire using the same that has a frictional force on ice and abrasion resistance superior to conventional technologies can be provided.

BRIEF DESCRIPTION OF THE DRAWING

FIG. 1 is a partial cross-sectional view of an example of a pneumatic tire.

DETAILED DESCRIPTION

The present technology is explained in further detail below.

FIG. 1 is a partial cross-sectional view of an example of a pneumatic tire for a passenger vehicle according to the present technology.

In FIG. 1, the pneumatic tire is shown being formed from a pair of right and left bead portions 1,1, a pair of right and left side walls 2, and a tread 3 extending between both side walls 2. A carcass layer 4 embedded with fiber cords is mounted between the bead portions 1,1. An end of the carcass layer 4 is folded over and up from a tire inner side to a tire outer side around a bead core 5 and a bead filler 6. In the tread 3, a belt layer 7 is provided along an entire periphery of the tire 1 on an outer side of the carcass layer 4. Additionally, rim cushions 8 are provided in portions of the bead portions 1 that are in contact with a rim.

The rubber composition of the present technology described below is especially useful in the tread 3.

Rubber Component

Any rubber that can be compounded in a rubber composition for use in tire treads may be used as the rubber component for use in the present technology, and examples include natural rubber (NR), isoprene rubber (IR), butadiene rubber (BR), styrene-butadiene copolymer rubber (SBR), acrylonitrile-butadiene copolymer rubber (NBR), and the like. One of these may be used alone, or two or more may be used in any combination. Additionally, a molecular mass and a microstructure of the rubber component is not particularly limited and may by terminally modified by an amine, amide, silyl, alkoxysilyl, carboxyl, or hydroxyl group, or the like, or be epoxidated.

Among these, from a perspective of the effectiveness of the present technology, the rubber component preferably includes at least one diene rubber selected from NR and BR.

Gel

The gel used in the present technology is not limited as long as it is a gel obtained by gelating a polyvinyl alcohol, and preferably is a gel that is obtained by dissolving a polyvinyl alcohol powder in an aqueous solution containing water or water and an organic solvent including a group selected from a hydroxy group, an amino group, and an amide group; and crosslinking by adding a crosslinking agent thereto.

An example of the polyvinyl alcohol used in the present technology is a polyvinyl alcohol normally obtained by gelating a polyvinyl acetate resin. A degree of gelation is 75 mol % or greater, preferably 80 mol % or greater, and more preferably from 85 to 94 mol %. Examples of the polyvinyl acetate resin include, in addition to polyvinyl acetate, which is a homopolymer of vinyl acetate, copolymers of vinyl acetate and another monomer that is copolymerizable with vinyl acetate such as a copolymer of ethylene vinyl acetate and the like. Examples of other monomers that are copolymerizable include unsaturated carboxylic acids, olefins, vinyl ethers, unsaturated sulfonic acids, and the like. A degree of polymerization of the polyvinyl alcohol is, for example, from 300 to 3,000, and preferably from 400 to 1,600. Note that the polyvinyl alcohol may be modified. For example, aldehyde-modified polyvinyl formal, polyvinyl acetal, polyvinyl butyral, and the like can be used. Additionally, due to considerations of solubility in the water, preferably a powderized polyvinyl alcohol is used.

Additionally, while not particularly limited, examples of the organic solvent include the following.

Examples of the organic solvent including a hydroxy group include ethylene glycol, diethylene glycol, propylene glycol, ethylene carbonate, propylene carbonate, trimethylene glycol, 1,3-octylene glycol, ethylene glycol monohexyl ether, diethylene glycol monoethyl ether, propylene glycol monoethyl ether, 1,3-butanediol, hexylene glycol, 1,5-pentanediol, benzyl alcohol, 2-ethylhexanol, n-octanol, ethylene glycol monophenyl ether, and the like.

Examples of the organic solvent including an amino group include alkanolamines such as monoethanolamine, diethanolamine, triethanolamine, 2-(2-aminoethoxy)ethanol, N,N-dimethylethanolamine, N,N-diethylethanolamine, N,N-dibutylethanolamine, N-methylethanolamine, N-ethylethanolamine, N-butylethanolamine, N-methyldiethanolamine, monoisopropanolamine, diisopropanolamine, triisopropanolamine, and the like; polyalkylene polyamines such as diethylenetriamine, triethylenetetramine, propylenediamine, N,N'-diethylethylenediamine, 1,4-butanediamine, N-ethyl-ethylenediamine, 1,2-propanediamine, 1,3-propanediamine, 1,6-hexanediamine, and the like; fatty amines such as 2-ethyl-hexylamine, dioctylamine, tributylamine, tripropylamine, triallylamine, heptylamine, cyclohexylamine, and the like; aromatic amines such as benzylamine, diphenylamine, and the like; cyclic amines such as piperazine, N-methyl-piperazine, methyl-piperazine, hydroxyethylpiperazine, and the like; and the like.

Examples of the organic solvent including an amide group include N-methylacetamide, N-methylformamide, N-methylpropanamide, formamide, N,N-dimethylacetamide, N,N-dimethylformamide, 1-methyl-2-pyrrolidone, 2-pyrrolidinone, ε-caprolactam, acetamide, and the like.

The above solvents may also be used in mixtures of two or more types.

Examples of the crosslinking agent include boron compounds such as borax, boric acid, borates (i.e., orthoboric acid salt, $InBO_3$, $ScBO_3$, $YBO_3$, $LaBO_3$, $Mg_3(BO_3)_2$, $Co_3(BO_3)_2$, diborates (i.e., $Mg_2B_2O_5$, $CO_2B_2O_5$), metaborates (i.e., $LiBO_2$, $Ca(BO_2)_2$, $NaBO_2$, $KBO_2$), tetraborates (i.e., $Na_2B_4O_7 \cdot 10H_2O$), pentaborates (i.e., $KB_5O_8 \cdot 4H_2O$, $Ca_2B_6O_{11} \cdot 7H_2O$, $CsB_5O_5$), and the like; titanium lactate or organic titanium compounds such as titanium lactate, dihydroxytitanuim bis(lactate), dihydroxytitanuim bis(glycolate), dihydroxy bis(lactate), titanium lactate ammonium salt, titanium diammonium, dihydroxy bis(slate) titanium ammonium, diisopropoxy titanium bis(triethanol aminate), di-n-butoxy titanium bis(triethanol aminate), diisopropoxy titanium bis(triethanol aminate), titanium tetrakis(acetylacetonato) and the like; water soluble organic zirconium compounds such as monohydroxytris(lactate) zirconium ammonium, tetrakis(lactate) zirconium ammonium, monohydroxytris(slate) zirconium ammonium, and the like; and the like. Among these, from the perspective of abrasion resistance, it is more preferable that an organic titanium compound is used.

A mixture ratio of polyvinyl alcohol powder and water or aqueous solution containing the water and the organic solvent is preferably set so that when a mass of the former is 1, a mass of the latter is from 5 to 55. In other words, the ratio of polyvinyl alcohol powder to the water or aqueous solution can be from 1:5 through 1:55.

Additionally, the crosslinking agent is preferably added at a ratio of from 0.1 to 60% with respect to the polyvinyl alcohol powder. If the content of the crosslinking agent is less than 0.1 mass %, gellation may not be sufficient. On the other hand, if the content exceeds 60 mass %, there is a tendency for the soft micro-bodies to become unable to be formed and the frictional force on ice declining due to the mixture becoming excessively hard. The preferable content of the crosslinking agent differs based on the type of crosslinking agent used, and when using sodium tetraborate is from 6 to 60 mass %.

Composition Ratios of the Rubber Composition for Use in Tire Treads

The rubber composition for use in tire treads of the present technology includes a rubber component and, per 100 parts by mass thereof, from 1 to 20 parts by mass of the gel described above. If the compounded amount of the gel is less than 1 part by mass, the compounded amount will be too small and the effects of the present technology cannot be achieved. Likewise, if the compounded amount exceeds 20 parts by mass, abrasion resistance will be negatively affected.

In the rubber composition for use in tire treads of the present technology, a more preferable compounded amount of the gel is from 5 to 15 parts by mass per 100 parts by mass of the rubber component.

With the rubber composition for use in tire treads of the present technology, the gel in the rubber exists as granular, soft micro bodies, and, therefore, adhesion between the tread and ice is enhanced and frictional force on ice is enhanced. Additionally, while travelling, the gel detaches from the tread, which leads to a surface of the tread becoming rough and frictional force on ice enhancing.

In addition to the aforementioned components, the rubber composition for use in tire treads according to the present technology can also contain various types of additives that are commonly added to rubber compositions for use in tire treads, such as vulcanizing and crosslinking agents, vulcanizing and cross-linking accelerators, fillers, antiaging agents, plasticizers, and the like. The additives may be kneaded in according to a general method and used in vulcanizing or cross-linking Compounded amounts of these additives may be any conventional standard amount, so long as the object of the present technology is not hindered. Additionally, the rubber composition of the present technology can be used to manufacture a pneumatic tire according to a conventional method for manufacturing pneumatic tires.

WORKING EXAMPLES

The present technology is further explained in detail with reference to the examples and comparative examples described hereinafter, but the present technology is not limited by these examples.

Working Examples 1 to 7 and Comparative Examples 1 to 3

Preparation of Sample

First, a gel was produced by mixing polyvinyl alcohol powder PVA (Polyvinyl alcohol #500, manufactured by Kanto Chemical Co., Ltd.; degree of gelation=86.5 mol %, average degree of polymerization=500), water or an aqueous solution containing water and an organic solvent, and a crosslinking agent according to the formulations (parts by mass) shown in Table 1 below. Borax (manufactured by Kenei Pharmaceutical Co., Ltd.) was used as the sodium tetraborate crosslinking agent. Additionally, diisopropoxy titanium bis (triethanol aminate) (Orgatix TC400, manufactured by Matsumoto Fine Chemical Co., Ltd.) was used as the organic titanium compound. Ex850 (manufactured by Nagase Chemtex Corporation) was used as diethylene glycol, the organic solvent.

Next, according to the formulations (parts by mass) shown in Table 2 after kneading the components, except for the vulcanization accelerator and the sulfur, in a 1.7 liter sealed Banbury mixer for five minutes, the mixture was extruded from the mixer at about 150° C. and cooled to room temperature. Thereafter, the rubber composition was obtained by placing the composition in the same Banbury mixer again, adding the vulcanization accelerator and the sulfur and kneading. Next, the rubber composition thus obtained was vulcanized in a predetermined mold at 160° C. for 20 minutes to obtain a vulcanized rubber test sample, and then the test methods shown below were used to measure the physical properties thereof.

Frictional force on ice: The vulcanized rubber test sample was affixed to a flat cylindrical rubber base and a coefficient of friction on ice was measured using an inside drum frictional force on ice tester. A measurement temperature was −1.5° C., a load was 5.5 kg/cm³, and a speed of rotation of the drum was 25 km/h. The results are shown as index values with the Comparative Example being 100. Larger index values indicate excellent frictional force between the rubber and the ice.

In accordance with Japanese Industry Standard (JIS) K6264, a Lambourn abrasion resistance test machine (manufactured by Iwamoto Quartz GlassLab Co., Ltd.) was used to measure an amount of abrasion under the following conditions: load=4.0 kg (39 newtons) and slip ratio=30%. (Amount of abrasion of Comparative Example 1)×(Amount of abrasion of the vulcanized rubber test sample) was set as an index value of 100. Higher index values indicate excellent abrasion resistance.

The results are also shown in Table 2.

TABLE 1

|  | PVA | Crosslinking agent | Water | Organic solvent |
|---|---|---|---|---|
| Gel 1 | 0.5 g | 0.3 g (borax) | 26 g | — |
| Gel 2 | 1.0 g | 0.3 g (borax) | 26 g | — |
| Gel 3 | 5.0 g | 0.3 g (borax) | 26 g | — |
| Gel 4 | 1.0 g | 0.3 g (borax) | 10 g | 16 g (diethylene glycol) |
| Gel 5 | 1.0 g | 0.3 g (organic titanium compound) | 26 g | — |

TABLE 2

|  | C. E. 1 | C. E. 2 | C. E. 3 | W. E. 1 | W. E. 2 | W. E. 3 | W. E. 4 | W. E. 5 | W. E. 6 | W. E. 7 |
|---|---|---|---|---|---|---|---|---|---|---|
| NR*1 | 50 | 50 | 50 | 50 | 50 | 50 | 50 | 50 | 50 | 50 |
| BR*2 | 50 | 50 | 50 | 50 | 50 | 50 | 50 | 50 | 50 | 50 |
| Carbon black*3 | 35 | 35 | 35 | 35 | 35 | 35 | 35 | 35 | 35 | 35 |
| Silica*4 | 25 | 25 | 25 | 25 | 25 | 25 | 25 | 25 | 25 | 25 |
| Silane coupling agent*5 | 2 | 2 | 2 | 2 | 2 | 2 | 2 | 2 | 2 | 2 |
| Zinc white*6 | 4 | 4 | 4 | 4 | 4 | 4 | 4 | 4 | 4 | 4 |
| Stearic acid*7 | 2 | 2 | 2 | 2 | 2 | 2 | 2 | 2 | 2 | 2 |
| Antiaging agent*8 | 2 | 2 | 2 | 2 | 2 | 2 | 2 | 2 | 2 | 2 |
| Wax*9 | 2 | 2 | 2 | 2 | 2 | 2 | 2 | 2 | 2 | 2 |
| Process oil*10 | 20 | 20 | 20 | 20 | 20 | 20 | 20 | 20 | 20 | 20 |
| PVA*11 | — | 5 | — | — | — | — | — | — | — | — |
| Gel 1 | — | — | — | 5 | — | — | — | — | — | — |
| Gel 2 | — | — | 30 | — | 1 | 5 | 15 | — | — | — |
| Gel 3 | — | — | — | — | — | — | — | 5 | — | — |
| Gel 4 | — | — | — | — | — | — | — | — | 5 | — |
| Gel 5 | — | — | — | — | — | — | — | — | — | 5 |
| Sulfur*12 | 1.5 | 1.5 | 1.5 | 1.5 | 1.5 | 1.5 | 1.5 | 1.5 | 1.5 | 1.5 |
| Vulcanization accelerator*13 | 1.5 | 1.5 | 1.5 | 1.5 | 1.5 | 1.5 | 1.5 | 1.5 | 1.5 | 1.5 |
| Frictional force on ice | 100 | 96 | 119 | 110 | 105 | 110 | 116 | 106 | 110 | 118 |
| Abrasion resistance | 100 | 99 | 75 | 100 | 102 | 101 | 101 | 100 | 110 | 112 |

Notes to Table 2:
"C.E." is used as an abbreviation of "Comparative Example" and
"W.E." is used as an abbreviation of "Working Example".
*1NR (RSS#3)
*2BR (Nipol BR1220, manufactured by Zeon Corporation)
*3Carbon black (SEAST 6, manufactured by Tokai Carbon Co., Ltd.)
*4Silica (Niosil AQ, manufactured by Tosoh Silica Corporation)
*5Silica coupling agent (Si69, manufactured by Evonik Degussa Japan, Co., Ltd.)
*6Zinc oxide (Zinc Oxide #3, manufactured by Seido Chemical Industry Co., Ltd.)
*7Stearic acid (Beads Stearic Acid, manufactured by NOF Corporation)
*8Antiaging agent (Santoflex 6PPD, manufactured by Flexsys)
*9Wax (Paraffin Wax, manufactured by Ouchi Shinko Chemical Industrial Co., Ltd.)
*10Process oil (Extract No. 4S, manufactured by Showa Shell Sekiyu K.K.)
*11PVA (Polyvinylalcohol #500, manufactured by Kanto Chemical Co., Ltd.)
*12Sulfur ("Golden Flower" Oil Treated Sulfur Powder, manufactured by Tsurumi Chemical)
*13Vulcanization accelerator (Noccelar CZ-G made by Ouchi Shinko Chemical Industrial Co., Ltd.)

As is clear from the tables, in the rubber composition for use in tire treads prepared in Working Examples 1 to 7 the rubber component was compounded with a specific amount of a gel of a polyvinyl alcohol, and therefore, compared with the Conventional Example 1, which is representative of conventional technologies, frictional force on ice and abrasion resistance was superior.

On the other hand, Comparative Example 2 is an example wherein the PVA was not gelated, and instead was added as-is to the rubber composition. Therefore, neither frictional force on ice nor abrasion resistance was enhanced.

In Comparative Example 3, the compounded amount of the gel exceeded the maximum stipulated in the present technology, and therefore abrasion resistance was negatively affected.

What is claimed is:

1. A rubber composition for use in tire treads, comprising: a rubber component and, per 100 parts by mass thereof; from 1 to 20 parts by mass of a gel of a polyvinyl alcohol; wherein the gel of the polyvinyl alcohol comprises: a polyvinyl alcohol powder in an aqueous solution comprising water or water and an organic solvent including a group selected from a hydroxy group, an amino group, and an amide group; and a crosslinking agent including organic titanium compounds, said crosslinking agent crosslinking the polyvinyl alcohol wherein the crosslinking agent is present at a ratio of from 0.1 to 60 mass % with respect to the polyvinyl alcohol, and wherein the gel of the polyvinyl alcohol has a granular shape.

2. The rubber composition for use in tire treads according to claim 1, wherein, in a mixture ratio of the polyvinyl alcohol powder to the water or the aqueous solution comprising the water and the organic solvent, when a mass of the former is 1, a mass of the latter is from 5 to 55.

3. The rubber composition for use in tire treads according to claim 1, wherein the rubber component comprises at least one diene rubber selected from natural rubber and butadiene rubber.

4. A pneumatic tire comprising a studless tread formed using a rubber composition for use in studless tire treads, the rubber composition comprising
a rubber component and, per 100 parts by mass thereof,
from 1 to 20 parts by mass of a of a gel of a polyvinyl alcohol;
wherein the gel of the polyvinyl alcohol comprises: a polyvinyl alcohol powder in an aqueous solution comprising water or water and an organic solvent including a group selected from a hydroxy group, an amino group, and an amide group, and wherein the gel of the polyvinyl alcohol has a granular shape; and
a crosslinking agent including organic titanium compounds, said crosslinking agent crosslinking the polyvinyl alcohol.

5. The rubber composition according to claim 1, wherein the rubber component comprises natural rubber.

6. The rubber composition according to claim 1, wherein, the rubber component comprises butadiene rubber.

7. The rubber composition according to claim 1, wherein a degree of polymerization of the polyvinyl alcohol is from 300 to 3,000.

8. The rubber composition according to claim 1, wherein a degree of polymerization of the polyvinyl alcohol is from 400 to 1,600.

9. The rubber composition according to claim 1, wherein the gel of the polyvinyl alcohol is from 5 to 15 parts by mass per 100 parts by mass of the rubber component.

10. The rubber composition according to claim 1, wherein the polyvinyl alcohol comprises a polyvinyl acetate resin.

11. The rubber composition according to claim 10, wherein the polyvinyl acetate resin includes at least one selected from the group consisting of polyvinyl acetate, a copolymer of vinyl acetate, a monomer that is copolymerizable with vinyl acetate, and combinations thereof.

12. The pneumatic tire of claim 4, wherein the crosslinking agent is present at a ratio of from 0.1 to 60 mass % with respect to the polyvinyl alcohol.

* * * * *